E. C. HOPPING.
Improvement in Mechanical Escapements.
No. 132,833.  Patented Nov. 5, 1872.
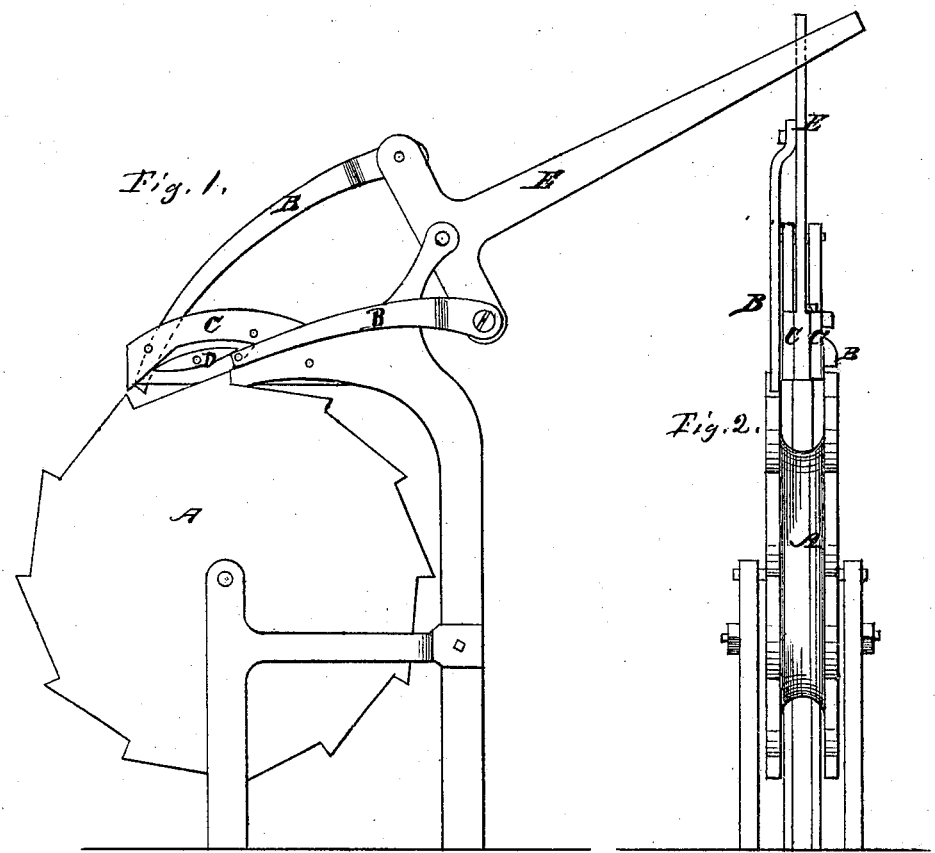
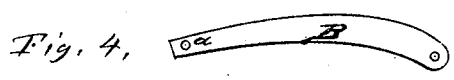
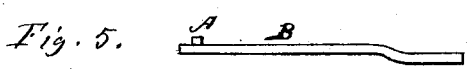
Attest
Wm. H. Gooding.
Edward Collier.
Inventor:
Eugene C. Hopping

UNITED STATES PATENT OFFICE.

EUGENE C. HOPPING, OF MADISON, NEW JERSEY, ASSIGNOR OF ONE-HALF OF HIS RIGHT TO EUGENE A. ELY, OF SAME PLACE.

IMPROVEMENT IN MECHANICAL ESCAPEMENTS.

Specification forming part of Letters Patent No. 132,833, dated November 5, 1872.

*To all whom it may concern:*

Be it known that I, EUGENE C. HOPPING, of Madison, New Jersey, have invented certain Improvements in Escapement-Wheels and Pallets, of which the following is a specification:

The invention relates to the means provided to release one finger of the pallet from the tooth of the escapement-wheel at the moment the force comes upon the other finger, so as to do away entirely all vestiges of stopping and starting and produce a steady continuous rotary movement of the wheel, by which an escapement is made available for other mechanical purposes than that of measuring in timepieces, and can be used in cases where pendulums and fly-wheels are undesirable. This object is attained by means of peculiarly-constructed cams, in which a projection on the finger or pallet is caused to travel, and which controls its movement.

In the drawing, A is the wheel; B, the pallets or fingers. C is a cam; D, a vibrating guide on the cam; and E is the operating-lever.

Force being applied to the pallet by the wheel, the pin $a$ on the pallet B, by sliding up the incline under the vibrating guide D while traveling backward, lifts the pallet from the tooth, and on reversion of pressure the pin travels over the guide to the bottom of the next-coming tooth on the wheel. The fingers being attached equidistant from the center to the ends of a cross-bar on E, the operating-lever, the length of the stroke of the end of E can be given as may be required by the relative distance of point from point on the teeth of the wheel and length of the lever-arm E.

As cams will operate in large machinery with a stationary as well as with a vibrating guide, I do not confine myself to any guide that may not be necessary.

I am aware of Crane's finger or pallet guide, which has but the one effect of guiding the finger down into the tooth of the wheel. I produce the additional effect of lifting the one finger clear of the wheel at the same time that the other is guided to the bottom of tooth and receives the pressure, superseding the need of momentum for releasing the pallet from the wheel and the back action inevitably consequent thereupon. The fingers can be extended back of the pivot in the cross-bar on E, and be operated by the same cams at the end. I do not confine myself to the lower end.

What I claim is—

1. The cam C, as and for the purpose specified and shown.

2. The wheel A, fingers B, cam C, and lever E, combined and operated substantially as hereinabove set forth.

EUGENE C. HOPPING.

Witnesses:
 W. M. GOODING,
 EDWARD COLLVER.